United States Patent [19]
Melcher et al.

[11] Patent Number: 5,223,234
[45] Date of Patent: Jun. 29, 1993

[54] METHOD FOR PRODUCING MOLYBDENUM TRIOXIDE ($MoO_3$) FROM RAW MATERIALS THAT CONTAIN $MoS_2$

[75] Inventors: Gerhard Melcher; Friedrich Megerle, both of Cologne; Claudio Q. Diaz; Gerardo A. Herrera, both of Rancagua, Chile

[73] Assignees: Kloeckner-Humboldt-Deutz AG, Fed. Rep. of Germany; Corporacion Nacional del Cobre de Chile, Chile

[21] Appl. No.: 842,793

[22] Filed: Feb. 27, 1992

Related U.S. Application Data

[63] Continuation of Ser. No. 454,521, Dec. 21, 1989, abandoned.

[30] Foreign Application Priority Data

Dec. 22, 1988 [DE] Fed. Rep. of Germany ....... 3843172

[51] Int. Cl.$^5$ .................. C01G 39/00; C22B 34/30
[52] U.S. Cl. ...................................... 423/59; 423/53; 423/606
[58] Field of Search .................. 423/53, 59, 606; 75/746, 751, 754, 623; 266/148, 168, 172, 201, 217, 225, 227; 422/129; 502/321

[56] References Cited

U.S. PATENT DOCUMENTS

| | | | |
|---|---|---|---|
| 1,426,602 | 8/1922 | Robertson | 423/606 |
| 1,660,150 | 2/1928 | Cobb | 266/148 |
| 3,139,326 | 6/1964 | Costello | 423/606 |
| 3,300,300 | 1/1967 | Blanks et al. | 266/172 |
| 3,463,472 | 8/1969 | Worner | 266/172 |
| 3,700,221 | 10/1972 | Holy | 266/148 |
| 3,848,049 | 11/1974 | Rouzio et al. | 423/606 |
| 4,226,406 | 10/1980 | Frolov et al. | 266/148 |
| 4,283,045 | 8/1981 | Melcher et al. | 266/172 |
| 4,291,011 | 9/1981 | Griffiths | 422/129 |
| 4,296,077 | 10/1981 | Heuer et al. | 423/53 |
| 4,334,924 | 6/1982 | Kim et al. | 75/24 |
| 4,380,469 | 4/1983 | Sulzbacher | 266/168 |

FOREIGN PATENT DOCUMENTS

| | | | |
|---|---|---|---|
| 634067 | 1/1962 | Canada | 423/606 |
| 2830394 | 1/1980 | Fed. Rep. of Germany | 423/606 |
| 3615437 | 8/1987 | Fed. Rep. of Germany | 423/59 |
| 1013409 | 4/1983 | U.S.S.R. | 423/606 |
| 910361 | 11/1962 | United Kingdom | 423/59 |
| 1265486 | 3/1972 | United Kingdom | 423/53 |

Primary Examiner—Michael Lewis
Assistant Examiner—Steven Bos
Attorney, Agent, or Firm—Hill, Steadman & Simpson

[57] ABSTRACT

A method and apparatus for producing molybdenum trioxide from raw materials containing molybdenum disulfide including melting the raw materials in an oxidizing atmosphere volatilizing a major portion of the raw materials as molybdenum trioxide with the remainder bonded in a molten slag as $MoO_4$ and directing an oxidizing gas onto the molten slag to convert the $MoO_4$ to molybdenum trioxide with the volatilization gas and the gas from the slag being united, the gas cooled and the molybdenum trioxide condensed from the gas into solid form (undesirable admixtures are separated from molybdenum trioxide raw oxides hydrometallurgically).

6 Claims, 1 Drawing Sheet

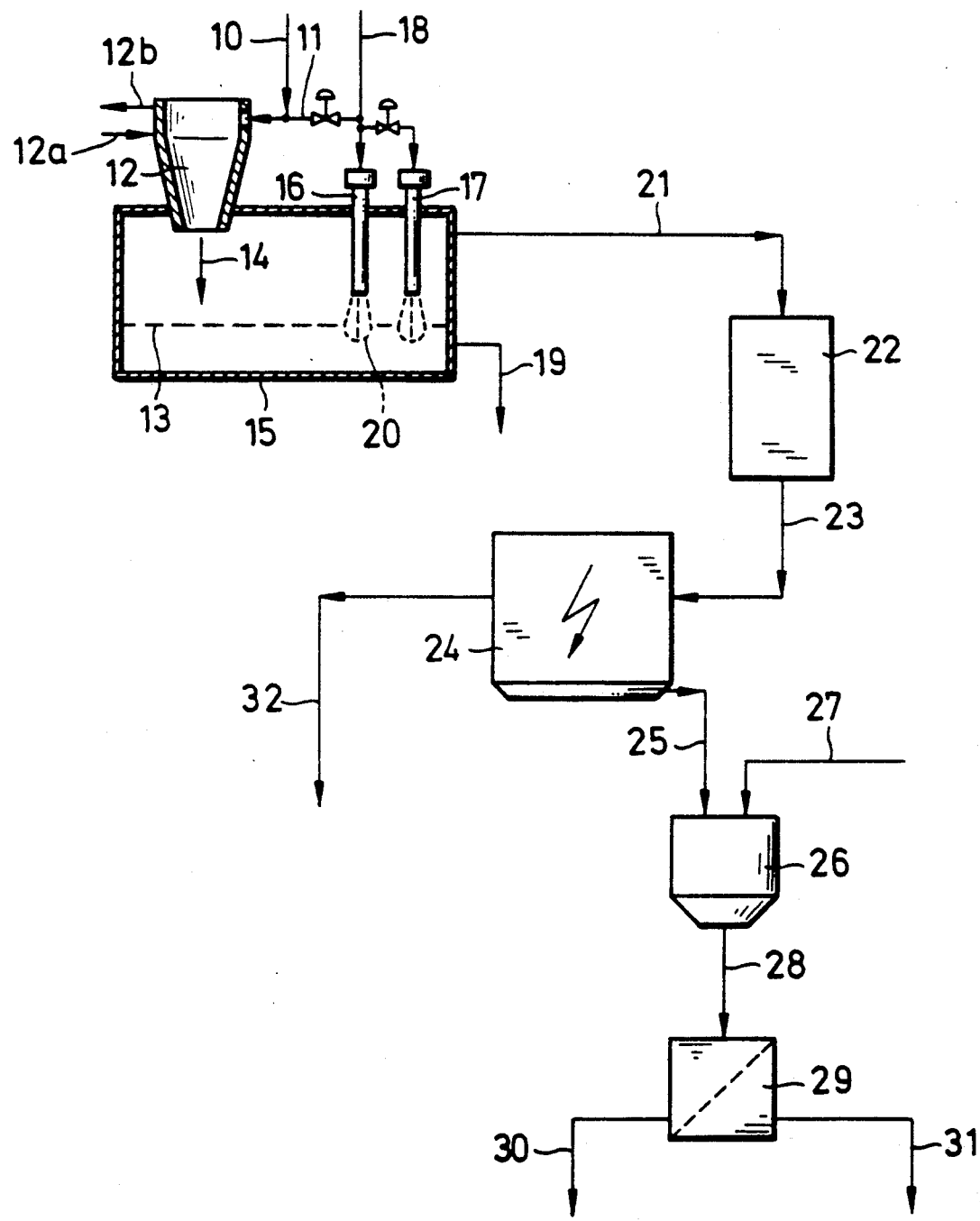

METHOD FOR PRODUCING MOLYBDENUM TRIOXIDE (MoO₃) FROM RAW MATERIALS THAT CONTAIN MoS₂

This is a continuation of application Ser. No. 454,521, filed Dec. 21, 1989, now abandoned.

BACKGROUND OF THE INVENTION

The invention relates to a method for producing molybdenum trioxide ($MoO_3$) from raw materials that contain molybdenum disulfide ($MoS_2$).

The most important raw material for the production of molybdenum trioxide is a floatation concentrate that contains $MoS_2$ which is often produced as a by-product of copper production in the processing of ores. Such molybdenum concentrates that contain $MoS_2$ typically contain about 45–55% Mo, 1–5% Cu, 1–5% Fe, and 8–38% S as their main constituents, along with other admixtures as well as matrix constituents. The processing industry requires a molybdenum trioxide having at least 63% Mo, a maximum of 0.3% Cu, a maximum of 0.1% Fe and a maximum of 0.1% S. In known methods for acquiring the necessary products, the sulfidic molybdenum concentrate is calcined in a pyrometallurgical process to melt it and to volatilize the molybdenum trioxide due to the high vapor pressure at low temperatures. Also in known processes, the molybdenum trioxide acquired in this fashion is subsequently washed with water after its condensation out of the exhaust gas in solid form, since volatilized impurities or impurities such as copper and iron discharged together with the molybdenum trioxide are present as sulfates that are easily soluble in water.

In order to obtain a somewhat high proportion of volatilized molybdenum trioxide in the pyrometallurgical process, adequately high temperatures above 1,000° C. must be present when volatilizing molybdenum trioxide as shown in German published application 36 15 437. Only about 60% of the molybdenum content utilized can be volatilized in this way, i.e. a melt/slag is formed in addition to the $MoO_3$ vapor phase and this melt/slag contains not only the matrix and the main quantity of the metallic impurities of the concentrate, but also contains a high proportion of molybdenum that can amount to about 40%, for example. In previous methods, this slag had to be subjected to a separate after-treatment and metallurgical re-processing that usually involved grinding the cold slag and a subsequent, wet-metallurgical process, see the textbook "Chemische Technologie" by Professor Winnacker, Professor Kuechler, Carl Hanser, Verlag, Munich 1961, Page 466. These many different process steps required to achieve a high molybdenum yield of, for example, 97% and an adequate quality of the $MoO_3$ as well in $MoO_3$ cause high losses, entail high production costs and involve a discontinuous operation. The existing process is thus uneconomical overall.

An object of the invention is to create an economical method for the production of $MoO_3$ from raw materials that contain $MoS_2$ that, in a compact system, enables a high yield of high-purity molybdenum of greater than 97%, enables a reduction of the various process steps to a minimum degree and also enables a fully continuous process.

FEATURES OF THE INVENTION

Characteristic features of the method of the invention are as follows.

The raw materials containing $MoS_2$ are melted such as in a melting means, for example, by suspension melting, particularly in a melting cyclone in an oxidizing atmosphere so that one part (approximately 50% through 90%) of the molybdenum volatilizes or vaporizes as $MoO_3$ and the remaining part (about 10%–50%) of the molybdenum is bonded in a liquid slag as $MoO_4$. According to a special feature of the invention, an oxidizing gas having a high impulse is blown through at least one insufflation lance onto the melt/slag collected in a hearth furnace and the $MoO_4$ bonded in the slag is thereby volatilized by conversion into $MoO_3$ and the slag is thereby depleted of molybdenum, for example to below 8% molybdenum. The exhaust gas of the melting means that contains $MoO_3$ vapor and the exhaust gas of the insufflation reactor part that contains $MoO_3$ vapor and is largely free of other metal oxide vapors are combined. Over 97% of the molybdenum contained in the raw material utilized can be acquired as high-purity molybdenum trioxide in this way in a compact system in a fully continuous way without involving numerous expensive process stages.

As a result of the top-blowing reactor part that can be combined with the melting means such as, for example, a melting cyclone to form a single, common, compact hearth furnace unit, the molybdenum content of the slag can be lowered from about 25–50% to far below 8%, this enabling a high molybdenum yield of more than 97%. Advantageously, the melting means is a melting cyclone in which the raw materials are calcined and melted as a sulfidic molybdenum concentrate in suspension with oxygen at temperatures of about 1,350° C. through about 1,600° C. and have a combustion factor of the oxygen of $\lambda = 1.2$ through 1.5.

Other objects, advantages and features of the invention will become more apparent with the teaching of the principles thereof in connection with the disclosure of the preferred embodiment in the specification, claims and drawing, in which:

DESCRIPTION OF THE DRAWING

The single FIGURE of the drawings is a schematic showing of a process and equipment constructed and operating in accordance with the principles o the invention.

DESCRIPTION OF THE PREFERRED EMBODIMENT

According to the drawing, dried sulfidic molybdenum concentrate 10 is continuously blown tangentially or secantially into a high-performance melting cyclone 12 together with oxygen 11 and, as warranted, a fluxing agent. The entry speed of the oxygen 11 into the cyclone 12 amounts to at least 50 m/sec and preferably lies in the range from about 80–100 m/sec., and, at least 50 kg/m²×sec, the flow density of the material in kg/m²×sec of the focused particle jet blown into the melting cyclone 12 is extremely high. The raw materials 10 blown into the melting cyclone 12 are calcined and melted in fractions of seconds at temperatures of about 1,350° C. through 1,600° C. and with a combustion factor of the oxygen of $\lambda = 1.2$ through 1.5. The ratio of oxygen 11 to concentrate 10 is set such that, after the combustion of the entire sulfidic sulfur, about 50-90% of the molybdenum is converted into a MoO$_3$ vapor and the remaining part (about 10-50%) of the molybdenum is bonded in a molten slag as MoO$_4$. This is achieved in that the combustion factor of the oxygen is set to $\lambda=1.2$ through 1.5. The fact that a part of the molybdenum is bonded in the slag 13 as MoO$_4$ causes an increased slag production and, thus, a better collecting and separating of the impurity metals such as iron and copper in the slag in oxidic form.

The particle jet composed of concentrate 10 and oxygen 11 enters into the water-cooled melting cyclone 12 at such a high speed that an extremely intense rotational flow occurs inside the melting cyclone, so that the proportion of unreacted concentrate in the exhaust gas 14 of the cyclone 12 amounts to less than 3% of the yield due to the centrifugal forces that occur. The melting cyclone 12 is constructed such that a multiple flow is achieved inside the cyclone and the high, mechanical dust losses in the exhaust gas of the cyclone that are otherwise standard are greatly reduced as a result.

The melting cyclone 12 that can also be operated with air as oxidation agent instead of being operated with oxygen is cooled and a coolant intake line is connected at 12a and a coolant return line is connected at 12b, whereby the principle of evaporation cooling can also be utilized.

Melt, gaseous or vaporous MoO$_3$ as well as exhaust gas 14 all proceed from the lower part of the melting cyclone 12 into a hearth furnace 15. This hearth furnace 15 is equipped with top-blowing lances 16, 17 whose upper sides are connected to a conduit 18 for supplying an oxidizing gas. The oxidizing gas is blown onto the collected melt/slag through the lances 16, 17 with a high impulse, this effecting an intensive, continuous volatilization of the MoO$_4$ bonded in the slag 13 by converting it into volatile MoO$_3$. As a result, a slag 19 having a molybdenum content depleted to less than 8% can be withdrawn from the hearth furnace 15 together with the main quantities of undesired admixtures Cu and Fe as well as matrix. The oxidizing gas blown onto the slag bath 13 with the lances 16, 17 has a partial oxygen pressure that lies in the range of $pO_2=0.05$ through 0.5 atm. This enables a conversion of the MoO$_4$ contained in the slag 13 into MoO$_3$, i.e. enables a selective MoO$_3$ volatilization, but prevents the formation of MoO$_2$. The top-blowing lances 16, 17 are preferably adjustable in height in order to be able to exactly set the optimum blow depression 20 on the surface of the slag bath and in order to also avoid spattering of the slag bath.

The exhaust gas of the lances 16, 17 that contains no metal oxide vapors other than vaporous MoO$_3$ is mixed with the exhaust gas of the melting cyclone 12 that contains MoO$_3$ vapor and is supplied via a common exhaust gas conduit 21 to a cooler 22 where it is cooled indirectly or directly by adding air, being cooled from a temperature of about 1,400° C. to the filter entry temperature of about 200° through 400° C. The cooled exhaust gas is then introduced via a conduit 23 into an electrostatic dust separator 24 or into some other filter system and the MoO$_3$ is then filtered out of the stream of exhaust gas in solid form and is introduced into a leaching unit 26 via conduit 25. The MoO$_3$ raw oxide 25 is therein leached with cold water 27 as solvent, and the sulfates of the undesirable admixtures that are present, for example, as 0.5 through 2% Cu and 0.5 through 2% Fe are dissolved. The solution is supplied via conduit 28 for a solid/liquid separating 29 and the high-purity molybdenum trioxide MoO$_3$ 30 that is not dissolved is separated from the solution 31 or from the filtrate that is supplied to a further-processing unit, whereas the high-purity MoO$_3$ 30 is dried in a drier. The exhaust gas 32 departing the dust separator 24 is eliminated via a chimney after scrubbing in a gas scrubber.

By mixing the exhaust gas of the melting means 12 that contains MoO$_3$ vapor with the exhaust gas of the top-blowing reactor part that contains MoO$_3$ vapor and is free of further metal oxide vapors, the content of impurities in the MoO$_3$ raw oxide separated from the combined exhaust gas streams in the separator 24 is lowered, leading to a simplification of the washing unit 26.

The results in the pilot plant as a numerical example:

Charge 100 kg sulfidic molybdenum concentrate 10 having the main constituents 51.5% Mo, 37.5% S, 1.9% Fe, 2.6% Cu.

Discharge

Final slag 19: 11.5 kg having 8% Mo, with the remainder being O$_2$, Cu$_2$O, FeO, Fe$_3$O$_4$, SiO$_2$, Al$_2$O$_3$, etc.

Yield of molybdenum in the trioxide (MoO$_3$):

$$M_o = 100 - \frac{11.5 \times 0.08}{51.5} \times 100 = 98.23\%$$

Quality of the trioxide (MoO$_3$) after the washing unit:

| |
| --- |
| Mo > 64% |
| Cu < 0.1% |
| S < 0.1% |
| Fe < 0.1% |

We claim:

1. A method of producing molybdenum trioxide from raw materials containing molybdenum disulfide comprising the steps of:
   melting raw materials containing molybdenum disulfide in an oxidizing atmosphere and volatilizing 50% to 90% of said molybdenum disulfide to generate an exhaust gas containing MoO$_3$ with a remainder of the molybdenum bonded in a molten slag as MoO$_4$;
   volatilizing the MoO$_4$ in said molten slag by converting the MoO$_4$ to volatile MoO$_3$ while directing an oxidizing gas onto the molten slag at a pressure in the range of $pO_2=0.05$ through 0.5 atm. thereby preventing the formation of MoO$_2$ and substantially depleting said molten slag of molybdenum with admixtures including at least Fe and Cu remaining in the slag;
   uniting said exhaust gas with said volatile MoO$_3$ to form a united gas;
   and cooling said united gas and condensing molybdenum trioxide from said united gas into solid form.

2. A method of producing molybdenum trioxide from raw materials containing molybdenum disulfide in accordance with the steps of claim 1:
   wherein the molybdenum content of the slag is lowered from about 25% through 50% to less than 8% by the direction of oxidizing gas onto the molten slag.

3. A method of producing molybdenum trioxide from raw materials containing molybdenum disulfide in accordance with the steps of claim 1:

wherein said raw materials are calcined and melted as sulfidic molybdenum concentrate in a melting cyclone in suspension with oxygen at temperatures in the range of 1350° C. to 1600° C.

4. A method of producing molybdenum trioxide from raw materials containing molybdenum disulfide in accordance with the steps of claim 1:
wherein the oxidizing gas is directed onto the slag bath in multiple streams with a partial oxygen pressure in the range of $PO_2 = 0.05$ through 0.5 atm.

5. A method of producing molybdenum trioxide from raw materials containing molybdenum disulfide in accordance with the steps of claim 1:
wherein the condensing of molybdenum trioxide from the united gas is conducted at exhaust gas temperatures in the range of 200° C. through 400° C. in a dust separator.

6. A method of producing molybdenum trioxide from raw materials containing molybdenum disulfide comprising the steps:

melting raw materials containing molybdenum disulfide in an oxidizing atmosphere and volatilizing an amount of molybdenum disulfide to generate an exhaust gas containing molybdenum trioxide with a remainder of the molybdenum bonded in a molten slag as $MoO_4$ with the melted materials;

volatilizing the $MoO_4$ in said molten slag by converting the $MoO_4$ to volatile molybdenum trioxide while directing an oxidizing gas onto the surface of the molten slag at a pressure in the range of $pO_2$ 0.05 through 0.05 atm. thereby preventing the formation of molybdenum dioxide and substantially depleting said molten slag of molybdenum with admixtures including at least Fe and Cu remaining in the slag;

uniting said exhaust gas with said volatile molybdenum trioxide to form a united gas;

cooling the united gas and condensing the molybdenum trioxide from the united gas into solid form;

and withdrawing the slag containing said undesirable admixture including Fe and Cu.

* * * * *